United States Patent [19]

Soehngen

[11] Patent Number: 4,828,699

[45] Date of Patent: May 9, 1989

[54] PROCESS FOR THE PRODUCTION OF MICROPOROUS POLYBENZIMIDAZOLE ARTICLES

[75] Inventor: John W. Soehngen, Cranbury, N.J.

[73] Assignee: Hoechst Celanese Corporation, Somerville, N.J.

[21] Appl. No.: 87,548

[22] Filed: Aug. 20, 1987

[51] Int. Cl.$^4$ ................................................ C08J 9/28
[52] U.S. Cl. ................................ 210/500.28; 521/64; 521/180; 521/184; 521/185; 521/189; 264/41
[58] Field of Search ............... 521/180, 184, 185, 189, 521/64; 210/500.28

[56] References Cited

U.S. PATENT DOCUMENTS

| | | | |
|---|---|---|---|
| 3,699,038 | 10/1972 | Boom | 210/500.28 |
| 3,720,607 | 3/1973 | Brinegar | 210/500.28 |
| 3,737,042 | 6/1973 | Boom | 210/500.28 |
| 3,841,492 | 10/1974 | Brinegar | 210/500.28 |
| 3,951,920 | 4/1976 | Senoo et al. | 521/64 |
| 4,020,142 | 4/1977 | Davis et al. | 210/500.28 |
| 4,448,687 | 5/1984 | Wang | 210/500.28 |
| 4,512,894 | 4/1985 | Wang | 210/500.28 |
| 4,628,067 | 12/1986 | Chen, Sr. et al. | 521/33 |
| 4,693,824 | 9/1987 | Sansone | 210/500.28 |
| 4,693,825 | 9/1987 | Trouw | 210/500.28 |

*Primary Examiner*—Morton Foelak
*Attorney, Agent, or Firm*—Lynch, Cox, Gilman & Mahan

[57] ABSTRACT

Disclosed herein are microporous polybenzimidazole articles prepared by the addition of a leachable additive to a polybenzimidazole polymer solution or dope and the subsequent leaching of the additive from the polybenzimidazole article. The microporous polybenzimidazole article may be formed into filaments or films. The micropores of the microporous polybenzimidazole article may be filled with an absorbent resin which will act to absorb chemicals or other harmful products. The microporous polybenzimidazole article with absorbent material may be formed into clothing which is highly resistant to both chemicals and heat.

21 Claims, No Drawings

4,828,699

PROCESS FOR THE PRODUCTION OF MICROPOROUS POLYBENZIMIDAZOLE ARTICLES

STATEMENT AS TO RIGHTS TO INVENTIONS MADE UNDER FEDERALLY SPONSORED RESEARCH AND DEVELOPMENT

This invention was made with government support under a subcontract with Rohm & Haas under prime contract no. F33657-81-C-0008 awarded by the Department of Defense (DOD). The government has certain rights in this invention.

BACKGROUND OF INVENTION

1. Field of Invention

This invention relates to a process for preparing microporous articles. More particularly, this invention relates to a process for the production of microporous polybenzimidazole articles.

2. Prior Art

Microporous products exhibit wide utility in a broad range of separatory fields. For example, microporous fabrics coated with a chemical absorbant can be manufactured into garments that are useful as chemically protective clothing since microporous fabrics possess a larger surface area per unit volume than non-microporous fabrics. See U.S. Pat. No. 4,460,641. In addition, microporous films can be useful as vents, gas-liquid transfer mediums, battery separators and for many other separatory functions. See, for example, U.S. Pat. Nos. 4,460,641, 4,359,510, 3,839,516, 3,801,404, 3,679,538, 3,558,764, and 3,426,754.

To generate such microporous structure, there are a wide variety of known techniques. For example, U.S. Pat. Nos. 4,290,987 and 3,839,516 disclose processes for the preparation of microporous fibers and films by a solvent stretching technique. However, neither of these patents disclose microporous, polybenzimdiazole articles.

U.S. Pat. No. 4,460,641 discloses chemically protective, microporous garments prepared from stretched and heat-set precursor hollow fibers. Although polybenzimidazole polymers are listed as acceptable polymers for the production of the fibers, the process for the preparation of the microporous structure which is disclosed is significantly different from the process of the instant invention.

U.S. Pat. No. 4,336,307 discloses hollow, water absorbing, polyester filaments having fine pores evenly distributed throughout the filaments. The microporous filaments are prepared by melt spinning a blend of a polyester with a sulfonated compound and removing a portion of the sulfonated compound from the filaments by washing it with an aqueous alkali solution. Although the process of this patent has some similarities to the process of the instant applicant, no microporous, polybenzimidazole articles are disclosed.

U.S. Pat. No. 4,055,702 discloses a process for imparting interconnecting microvoids to a solid fiber and impregnating those microvoids with various additives. The microvoids are produced by cold-drawing an undrawn or partially drawn, melt-spun fiber formed from a polyester, polyamide, polypropylene or high density polyethylene polymer in the presence of a nonsolvent, swelling liquid or vapor. See also U.S. Pat. No. 4,530,809 which discloses a similar cold-drawing process along with a hot drawing process. In addition, U.S. Pat. No. 3,325,342 discloses a process wherein a noncrystalline, unoriented, polyamide fiber is treated in an aqueous swelling agent to develop crystallinity and is then drawn to crystalize the yarn. Although processes for the production of microporous structures are disclosed in these patents, neither microporous polybenzimidazole articles nor the specific process of this application are disclosed.

Polybenzimidazoles polymers have been extensively studied recently because of their high degree of thermostability and chemical stability. These polymers have been formed into fibers, films or other shaped articles with great usefulness such as for reverse osmosis, ultrafiltration, ion exchange and electrodialysis separations. See U.S. Pat. Nos. 3,699,038, 3,720,607, 3,737,042, 3,841,492 and 3,851,025.

Although processes for the production of polybenzimidazole polmyer articles of great utility have been disclosed in various patents, none have disclosed the preparation of microporous polybenzimidazole polymers by the disclosed process.

It is therefore an object of the present invention to provide a process for preparing polybenzimidazole articles which are microporous.

It is a further object of the present invention to provide a process for preparing microporous polybenzimidazole articles by means of the addition and subsequent removal of a leachable additive.

It is a further object of this invention to provide a process for the formation of microporous polybenzimidazole articles which are useful in the production of flame retardant materials.

These and other objects as well as the scope, nature and utilization of the process will be apparent from the following description and the appended claims.

SUMMARY OF INVENTION

This invention involves a process for the production of microporous polybenzimidazole articles by the following steps:

(a) preparing a polybenzimidazole polymer solution;
(b) mixing with this polybenzimidazole polymer solution a leachable additive;
(c) forming a polybenzimidazole polymer article with the leachable additive interspersed within its structure; and
(d) removing the leachable additive from the polybenzimidazole article to form a microporous polybenzimidazole article.

Microporous polybenzimidazole fibers manufactured from this process can be woven into clothing fabric which is highly resistant to chemical reaction and has a high degree of thermal stability. Various types of chemical absorbants can be impregnated within the pores of the microporous fibers to further enhance the utility of the fibers. Microporous films produced by this process can be utilized where a high degree of thermal stability and resistance to chemical reaction is necessary, such as for separatory mediums for high temperature separations.

DETAILED DESCRIPTION OF INVENTION

A. The Starting Polymer

The polymeric material used to form the microporous polybenzimidazole article of the present invention is a linear polybenzimidazole. Polybenzimidazoles are a known class of heterocyclic polymers. Typical polymers of this class and their preparation are more fully described in U.S. Pat. No. 2,895,948, Re. U.S. Pat. No. 26,065, and in the Journal of Polymer Science, Vol. 50, pages 511-539 (1961) which are herein incorporated by reference. The polybenzimidazoles consist essentially of recurring units of the following Formulas I and II. Formula I is:

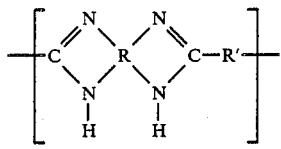

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

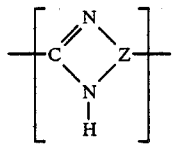

wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of the recurring units of Formulas I and II wherein R' is an aromatic ring or a heterocyclic ring.

As set forth in U.S. Pat. No. 3,174,947 and Re. U.S. Pat. No. 26,065, the aromatic polybenzimidazoles having the recurring units of Formula II may be prepared by self-condensing a trifunctional aromatic compound containing only a single set of ortho-disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heteroyclic dicarboxylic acid wherein the carboxyl groups are substituents upon a carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'(m-phenylene)-5,5'-bibenzimidazole;
poly-2,2'-(pyridylene-3″,5″)-5,5'-bibenzimidazole;
poly-2,2'(furylene-2″,5″)-5,5'-bibenzimidazole;
poly-2,2'-(naphthalene-1″,6″)-5,5'-bibenzimidazole;
poly-2,2'-(biphenylene-4″,4″)-5,5'-bibenzimidazole;
poly-2,2'-(biphenylene-4″,4″)-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone;
poly-2,2'-(m-phenylene)-5,5'-di(benzimidazole) methane;
poly-2,2'-(m-phenylene)-5,5'-di(benzimidazole) propane-2,2; and poly-2',2″-(m-phenylene)-5',5″-di(benzimidazole) ethylene-1,2 where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

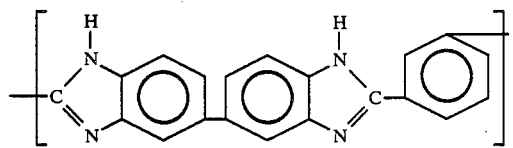

Any polymerization process known to those skilled in the art may be employed to prepare the polybenzimidazole which may then be formed into a semipermeable membrane. Representative techniques for preparing the polybenzimidazole are disclosed in U.S. Pat. Nos. 3,509,108, 3,549,603, and 3,551,389, which are assigned to the assignee of the present invention and are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3. The inherent viscosity (I.V.) as used herein is determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.3, e.g., about 0.3 to about 2.5.

The temperature employed in the second stage is at least 250° C., preferably at least 325° C., and more preferably from about 350° to about 425° C. The second stage reaction generally takes at least 0.5 hour, and preferably from about 1 to 4 hours or more. It is, of course, also possible to prepare the instant polymers via a one-step reaction. However, the previously-described two-step process is preferred. The polybenzimidazole solution is allowed to cool to a temperature of about room temperature. Such temperature is not crucial to the process.

B. Polybenzimidazole Polymer Solution

The polybenzimidazole polymer prepared from the polymerization process is mixed with a solvent commonly recognized as being capable of dissolving the particular polybenzimidazole polymer which is chosen. For instance, the solvent may be selected from those commonly utilized in the formation of a polybenzimidazole dry spinning solution including N,N-dimethylacetamide, N,N-dimethylformamide, dimethylsulfoxide, and N-methyl-2-pyrrolidone. The particularly preferred solvent is N,N-dimethylacetamide. Additional representative solvents include formic acid, acetic acid and sulfuric acid.

The polymer solutions may be prepared, for example, by dissolving sufficient polybenzimidazole in the solvent to yield a final solution containing from about 5 to about 30 percent, by weight of the polymer, based on the total weight of the solution and preferably from about 10 to about 20 percent by weight. One suitable means for dissolving the polymer in the solvent is by mixing the materials at a temperature above the normal boiling point of the solvent, for example from about 25° C. to about 120° C. above such boiling point, and at a pressure of 2 to 15 atmospheres for 1 to 5 hours. The resulting solutions are preferably filtered to remove any undissolved polymer. A minor amount of lithium chloride (2 percent or less by weight based on the total solution weight) may be added to the solution in accordance with the teachings of U.S. Pat. No. 3,502,606. The lithium chloride prevents the polybenzimidazole polymer from phasing out of the solution upon standing for extended periods of time.

C. Leachable Additive Addition

The polybenzimidazole polymer solution prepared above is next mixed with a leachable additive which is soluble in the solvent for the polybenzimidazole polymer to form a polybenzimidazole polymer/additive mixture. It is critical to the process that the leachable additive be soluble in the solvent for the polymer.

The leachable additive used in this process may include inorganic metal salts soluble in the solvent for the polybenzimidazole including lithium, sodium, potassium and strontium metals which have been formed into a salt with anions including carboxylates having from one to 12 carbon atoms, sulfonates, halides, phosphates and the like. Examples of such materials include: lithium chloride, sodium chloride, potassium chloride, lithium acetate, lithium butyrate, lithium propionate, lithium stearate, sodium acetate, potassium butyrate and such metal salts. Also included are ammonium salts such as ammonium chloride, ammonium sulfate and the like. The leachable additive also includes relatively low molecular weight esters, (molecular weight less than about 2000), preferably lower alkyl alcohol esters of a mono or dicarboxylic acids. Examples of such materials include ethyl acetate, methyl acetate, methyl proprionate and methyl butyrate. Also, useful herein are polyols including polyesterified polyols based upon ethylene glycol and other alkylene glycols such as propylene glycol, hexamethylene glycol as well as tri- and tetrapolyols including glycerine, trimethylopropane and trimethyloethane. The polyethers of these polyols may be formed from the base polyol or they may be, as in the case of alkylene glycols, formed from the corresponding polyalkylene oxide. The maximum weight of these materials should not exceed about 2000. Of particular usefulness herein are the polyethylene and polypropylene oxide-based surfactants which may have been modified with other relatively long-chain materials, such as lauryl alcohol.

The polybenzimidazole polymer solution may be mixed with the leachable additive solution by any conventional method including simply combining the components in one vessel. The amount of the leachable additive that is mixed with the polybenzimidazole polymer will vary depending on a number of factors including (1) the amount of leachable additive needed to produce suitable microporosity, (2) the subsequent handling and processing to which the polybenzimidazole article will be subjected, and (3) the permeability properties desired in the polybenzimidazole article. Depending on the type of leachable additive, it may be present within the polymer solution in an amount which will vary from about 10 to about 40 percent by weight and preferably from 15 to about 25 percent by weight based on the weight of the polybenzimidazole within the solution.

One suitable means for combining the leachable additive in the solvent solution is merely by mixing the materials at room temperature and stirring for a period of about 10 to about 45 minutes. It may be useful to heat the solution to about 50° C. to about 200° C. for about 5 to about 15 minutes to decrease the stirring time and to promote better dispersion of the additive throughout the polybenzimidazole polymer structure. The temperature of heating is not critical but should not exceed the boiling point of the solvent for the polymer.

Prior to the formation of the polybenzimidazole article, the solution should be filtered to remove any undissolved polybenzimidazole polymer or undissolved leachable additive. Once the polybenzimidazole leachable additive has been mixed with the polybenzimidazole in solution, the polybenzimidazole may be converted into a microporous polybenzimidazole article by any conventional technique.

D. Preparation of the Filamentary Material

The polybenzimidazole polymer solution containing the leachable additive may be spun to form a filamentry material. The term "continuous filamentary material" as used herein is intended to include monofilaments and multifilaments such as strand, yarn, cable, tow and the like.

The polybenzimdiazole polymer solution necessary for preparation of filamentary material should contain sufficient polybenzimidazole with dispersed leachable additive to yield a final solution suitable for extrusion containing from about 10 to 45 percent by weight of the polybenzimidazole polymer with dispersed leachable additive, based on the total weight of the solution, and preferably from about 20 to 30 percent by weight.

The polybenzimidazole polymers with dispersed leachable additives may be formed into continuous filamentary materials by solution spinning, that is, by dry or wet spinning. A solution of the polymer with dispersed leachable additives in an appropriate solvent such as N,N-dimethylacetamide, is drawn through an opening of predetermined shape into an evaporative atmosphere for the solvent in which most of the solvent is evaporated (dry) or into a coagulation bath (wet), resulting in the polymer having the desired shape. In the preferred embodiment, the dry spinning method is used for casting the filamentary material.

The polybenzimidazole solutions may be extruded through a spinnerette into a conventional-type downdraft spinning column containing a circulating inert gas, such as nitrogen, the noble gases, combustion gases or super-heated steam. The spinnerette face should be at a temperature of from about 100° to 170° C., the top of the column from about 120° to 220° C., the middle of the column from about 140° to 250° C., and the bottom of the column from about 160° to 320° C. After leaving the spinning column, the continuous filamentary materials are taken up, for example, at a speed in the range of from about 50 to 350 meters per minute. Further details for a method of dry spinning polybenzimidazole continuous filamentary materials are shown in U.S. Pat. No. 3,502,756, assigned to the same assignee as the present application, and this patent is hereby incorporated by reference.

E. Leachable Additive Removal

Once the continuous filamentary material is taken up, it is washed to remove the leachable additive and any remaining solvent. The leachable additive is leached from the extruded fiber with a suitable solvent for the chosen leachable additive, which solvent is a nonsolvent for the polymer. These leachable additive solvents are extractants which will dissolve the leachable additive dispersed with the polybenzimidazole polymer. Preferred among these solvents, depending of course on the solubility of the additive chosen, is hot water at a temperature of above about 50° C. and low molecular weight alcohols such as methanol, ethanol, etc. When the fiber produced by this process is to be used in the treatment of aqueous solutions, it is frequently found advantageous to employ water as a leaching medium, when it is effective for the purpose. The wash step is preferably carried out by immersing the fiber in the wash medium. In a preferred embodiment, a water wash medium is provided at a temperature from about 30° C. to about 100° C. Higher washing temperatures frequently increase the efficiency of the extraction. Satisfactory wash times commonly range from about 30 seconds to several hours and, when the wash temperature exceeds 50° C., from about 30 seconds to about 20 minutes.

F. Semipermeable Flat Film Membrane Formation

The polybenzimidazole polymer with dispersed leachable additive, prepared according to the above procedure, may also be formed into a flat film membrane by the following process. The solution of polybenzimidazole polymer with dispersed leachable additives, is deposited upon a support to form a wet film of the same. The nature of the support is not critical and may be selected from a variety of materials including ceramic, glass, or metallic plates (e.g., stainless steel). The support is preferably provided with retaining elements, or raised edges, whereby the solution is confined to the surface thereof at the desired location until its consistency is such that retaining elements are no longer needed. Numerous techniques are available for the application of the solution to the support as will be apparent to those skilled in the art. For example, the polybenzimidazole polymer solution may be simply poured upon a level support in a quantity sufficient for it to assume the desired uniform thickness. A blade is then drawn over the surface of the wet film to aid the deposition of a wet film of uniform thickness.

The thickness of the wet film deposited upon the support is influenced by the desired thickness of the polybenzimidazole semipermeable membrane ultimately to be produced. Generally, the wet film is deposited upon the support in a substantially uniform thickness of about 0.2 to about 30.0 mils and preferably 0.5 to about 4.0 mils. In a particularly preferred embodiment of the invention, the wet film is deposited in a thickness of about 1.0 to about 2.0 mils.

A quantity of solvent is next evaporated from the exposed surface of the wet film to allow the formation of a relatively thin solid layer (i.e., a thin porous polymeric film) on the exposed surface of the film. During the formation of the solid layer of the exposed surface of the film, the solvent present near the surface of the wet film is flashed off and a thin coagulated skin of polybenzimidazole polymer with dispersed leachable additive remains.

The evaporation of solvent from the exposed surface of the wet film may be accomplished by a variety of techniques as will be apparent to those skilled in the art. For instance, a stream of air or other gas at ambient or at an elevated temperature (e.g. approaching the boiling point of the solvent) may be simply directed at the exposed surface of the wet film. Other methods of evaporation are listed in U.S. Pat. No. 4,512,894, which is hereby incorporated by reference. The time required to form the desired thin solid layer upon the exposed surface of the wet film commonly ranges from about 5 seconds to about 30 minutes, and preferably from about 15 seconds to about 5 minutes. In a preferred embodiment of the invention, the wet film is placed in an oven at about 70° C. and is exposed to a stream of circulating air at ambient pressure for about 1 to 5 minutes.

G. Leachable Additive Removal

The resulting film bearing a thin solid layer upon its surface is next converted to a microporous semipermeable membrane by washing the film with a non-solvent for the polybenzimidazole polymer which is both a solvent for the leachable additive and capable of removing residual quantities of the polybenzimidazole solvent. Not only does the washing step remove any excess solvent, it also will remove the leachable additive from the solution. As with the removal of leachable additives from filaments, the suitable solvent for the leachable additive is one which is a nonsolvent for the polymer, such as water or low molecular weight alcohols, such as methanol or ethanol. When it is effective for the purpose, it is frequently advantageous to employ water as a leaching medium. The wash step is preferably carried out by immersing the film in the wash medium. In a preferred embodiment of the invention, a water wash medium is provided at a temperature from about 0° C. to about 100° C. Low temperature extraction, i.e., room temperature or below, may be preferred to produce reverse osmosis membranes. Satisfactory wash times commonly range from about 30 seconds to several hours, depending on the temperature of the wash medium. When the temperature of the wash medium exceeds 50° C., the preferable wash period is about 30 seconds to about 20 minutes. During the wash step, the remaining polybenzimidazole polymer within the wet film is coagulated while the solvent, which originally dissolved the polymer, is removed.

H. Post Washing Procedure

After the wash step, the semipermeable microporous polybenzimidazole article, either in its flat film or filament form, may also be annealed by contact with a non-aqueous annealing medium which comprises both a solvent and a non-solvent for the polybenzimidazole polymer at a temperature preferably below about 125° C. For such an annealing step, see for example, U.S. Pat. No. 4,448,687, which is incorporated herein by reference.

The polybenzimidazole film or filament prepared according to the process of this invention exhibits pores which are generally circular in shape and are located throughout the film or filament. The diameter of these pores ranges in size from about 0.01 to about 0.5 microns, preferably in the range of 0.05 to about 0.3 microns and most preferably in the range of about 0.08 microns to about 0.15 microns.

The microporous film or filament prepared according to the process of this invention may be impregnated with a chemical absorbant compound or resin having high surface area by mixing the polymer solution prior to coagulation with a chemical absorbant. The polybenzimidazole absorbant articles prepared according to this process are useful in the weaving of high temperature resistant and chemical resistant clothing.

Among the useful chemical absorbants are chloramides; strong base combinations such as lithium hydroxide dissolved in monoethanolamine and sodium hydroxide and diethylenetriamine dissolved in methyl cellulose; sodium and calcium hypochlorite; hydroxamic acids; oximes; phenols; metal complexes such as chromium complexes; $CrO_3$; $KMnO_4$, $Na_2S_2O_3$; amines such as piperazine, ethanolamine and alkaline aqueous amino acid solutions; various carboxylic acids; sulfonic acid; Ag-anthranilic acid; sodium bicarbonate in kerosene/$H_2O$ emulsion; glycerol; various n-chloro compounds; isocyanuric chlories; ethylenediamine; N,N-dichlorodimethyl hydantion, syn-bis(N-2,4,6-trichlorophenyl) urea, as well as any of the various counteragents known to deactivate the toxic H, G and V chemical warfare agents. Due to its ability to deactivate a wide variety of toxic agents, including the H, G and V chemical warfare agents, XXCC3 agent, a solid neutralization agent consisting of 90 percent syn-bis(N-chloro-2,4,6-trichlorophenyl) urea and 10 percent ZnO, is a preferred neutralization agent for use in the protective fabrics of this invention. In order to provide protection against more than one type of chemical agent, mixtures of neutralization agents may be employed. In another preferred embodiment, the chemical absorbant is activated charcoal.

The addition of these absorbant resin will render the microporous polybenzimidazole filaments chemically absorbant while retaining the advantages of the polybenzimidazole polymer structure. Uses for these products are in areas such as protective clothing which would absorb chemicals while being resistant to fire and heat. Such clothing is useful to military personnel during chemical attack or to chemical workers in the event of fire or explosion at a chemical plant.

The following examples are given as specific illustrations of the invention. All parts and precentages are by weight unless otherwise stated. It should be understood, however, that this invention is not limited to the specific details set forth in the Examples.

EXAMPLE 1

A polybenzimidazole leachable additive solution was prepared by mixing in a one liter mixing container 22.4 grams of lithium chloride, 11.2 grams of Pluronic L-61 (an ethoxylated surfactant commercially available from BASF-Wyandotte); 466.4 grams of a 24 percent by weight polybenzimidazole dope (i.v. 0.7) which contains 111.8 grams of poly-2,2'-(m-phenylene)-5-5'-bibenzimidazole having a viscosity of 450 poise at 30° C., 7.09 grams of lithium chloride, and 347.37 grams of dimethylacetamide. The entire solution was stirred for about 30 minutes until a uniform blend was obtained.

The polymer solution was then extruded at a temperature of 160° C. through a 10 hole, 100 micron spinnerette under pressure into a conventional 23 foot dry spinning chamber containing circulating heated nitrogen at a temperature of 250° C. as the evaporative atmosphere. Fibers formed from this process were withdrawn from the column and wound onto a perforated bobbin at 200 meters per minute. This sample was subsequently pressure washed on the bobbin in a conventional water wash bath at a temperature of about 80° C. and then dried in an oven at a temperature of about 250° for about 30 minutes. The product was then analyzed under an electron microscope. The polybenzimidazole polymer filament formed showed circular interconnecting pores with diameters ranging in size from about 0.05 microns to about 0.1 microns. The resulting fibers when measured using standard ASTM tests showed a tenacity of 0.93 grams per denier, an elongation of 79.4 percent, a modulus of 28 grams per denier and a 5.61 denier per filament.

EXAMPLE 2

A polybenzimidazole membrane was prepared by combining 0.19 grams of lithium chloride dissolved in 9.31 grams of dimethylacetamide with 1.2 grams of Pluronic L-61 (an ethoxylated surfactant commercially available from BASF-Wyandotte) and adding the resulting solution to 25 grams of a 24 percent by weight polybenzimidazole dope (i.v. 0.7) which was comprised of 6 grams of poly-2,2'(m-phenylene)-5-5'-bibenzimidazole with a viscosity of 450 poise at 30° C. and 0.38 grams of lithium chloride dissolved in 18.62 grams of dimethylacetamide. An unannealed membrane was prepared by pouring a sufficient quantity of the polybenzimidazole solvent solution on a nonwoven polyester fabric marketed by Eaton-Dikeman under the trademark Hollytex to form a 10 mil. thick polybenzimidazole membrane. The membrane was dried at room temperature (with air velocity of 1200 ft/min) for 12 hours. It was then washed with water at a temperature of 80° C. several times in a series of conventional wash baths and subsequently air dried for about 5 hours. The film was analyzed by electron microscopy and showed the presence of extensive pore structure in the range of 0.05 microns to about 0.1 microns.

As is apparent from this procedure, microporous polybenzimidazole products with pore sizes ranging from about 0.01 micron up to about 0.5 micron, both films and fibers, can be produced by the addition and subsequent extraction of leachable additives. These fibers can be woven into clothing material which is highly resistant to chemical reaction and has a high degree of thermal stability. Films produced by this process can be utilized as high temperature separatory media.

What is claimed:

1. A microporous polybenzimidazole product produced by a process comprising the steps of:
   (a) preparing a polybenzimidazole polymer solvent solution;
   (b) mixing with the polybenzimidazole polymer solution a leachable additive to form a polybenzimidazole polymer with an interspersed leachable additive;
   (c) forming a polybenzimidazole shaped article from the polybenzimidazole polymer with leachable additive interspersed within its structure; and
   (d) removing the leachable additive from the polybenzimidazole shaped article to form a microporous polybenzimidazole article with a pore size ranging from about 0.01 microns to about 0.5 microns.

2. A microporous polybenzimidazole filament produced by process comprising the steps of:
   (a) preparing a polybenzimidazole polymer solvent solution;
   (b) mixing with the polybenzimidazole polymer solution a leachable additive to form a polybenzimidazole polymer with an interspersed leachable additive;
   (c) spinning the polybenzimidazole polymer with interspersed leachable additive into a polybenzimidazole filamentary material; and
   (d) removing the leachable additive from the polybenzimidazole filamentary material to form a microporous polybenzimidazole filament with a pore size ranging from about 0.01 microns to about 0.5 microns.

3. A microporous polybenzimidazole film produced by a process comprising the steps of:
   (a) preparing a polybenzimidazole polymer solvent solution;
   (b) mixing with the polybenzimidazole polymer solution a leachable additive to form a polybenzimidazole polymer with an interspersed leachable additive;
   (c) casting the polybenzimidazole polymer with interspersed leachable additive into a polybenzimidazole film; and
   (d) removing the leachable additive from the polybenzimidazole film to form a microporous polybenzimidazole polymer film with a pore size ranging from about 0.01 microns to about 0.5 microns.

4. A microporous polybenzimidazole filament produced by a process comprising the steps of:
   (a) preparing a polybenzimidazole polymer solvent solution;
   (b) mixing the polybenzimidazole polymer solvent solution with an inorganic metal salt to form a polybenzimidazole polymer with interspersed inorganic metal salt;
   (c) spinning the polybenzimidazole polymer with interspersed inorganic metal salt into a polybenzimidazole filamentary material; and
   (d) washing the filament in water at a temperature from about 30° C. to about 100° C. for a period of about 30 seconds to several hours to remove the inorganic metal salt from the polybenzimidazole filamentary material to form a microporous polybenzimidazole filament with a pore size ranging from about 0.01 microns to about 0.5 microns.

5. A microporous polybenzimidazole film produced by a process comprising the steps of:
   (a) preparing a polybenzimidazole polymer solvent solution;
   (b) mixing with the polybenzimidazole polymer solvent solution lithium chloride comprising about 10 to about 40 percent by weight based on the total polymer weight to form a polybenzimidazole polymer with interspersed lithium chloride;
   (c) casting the polybenzimidazole polymer with interspersed lithium chloride solution into a polybenzimidazole film;
   (d) washing the film in water maintained at a temperature from about 0° C. to about 100° C. for a period of about 30 seconds to several hours to remove the lithium chloride from the polybenzimidazole film to form a microporous polybenzimidazole film with a pore size ranging from about 0.01 microns to about 0.5 microns.

6. The product as in any of claims 1, 2 or 3 wherein the leachable additive employed is soluble in the polybenzimidazole solvent solution and is selected from the group consisting of inorganic metal salts, low molecular weight esters, polyols and polyalkelene oxide-based surfactants.

7. The product as in any of claims 1, 2 or 3 wherein the leachable additive includes inorganic metal salts soluble in the solvent for the polybenzimidazole selected from the group consisting of lithium, sodium, potassium and strontium metals formed into a salt with anions selected from the group consisting of carboxylate materials having from one to 12 atoms, sulfonates, halides, phosphates, and the like.

8. The product as in any of claims 1, 2 or 3 wherein the leachable additive employed is a low molecular weight ester (molecular weight less than about 2000) selected from the group consisting of ethyl acetate, methyl acetate, methyl proprionate and methyl butyrate.

9. The product as in any of claims 1, 2, or 3 wherein the leachable additive employed is a polyol selected from the group consisting of propylene glycol, hexamethylene glycol, glycerine, trimethylopropane and trimethyloethane.

10. The product as in any of claims 1, 2 or 3 wherein the leachable additive is lithium chloride.

11. The product as in any of claims 1, 2 or 3 wherein the leachable additive is triethylene glycol.

12. The product as in any of claims 1, 2 or 3 wherein the leachable additive is a polyethylene or polypropylene oxide-based surfactant.

13. The product as in any of claims 1, 2 or 3 wherein the leachable additive comprises from about 10 to about 40 percent by weight based on the total weight of the polybenzimidazole polymer in the solution.

14. The product as in any of claims 1, 2 or 3 wherein the leachable additive is removed from the polybenzimidazole product by a solvent for the leachable additive which is also a nonsolvent for the polybenzimidazole polymer.

15. The product of claim 12 wherein the solvent employed for removal of the leachable additive is water.

16. The product as in any of claims 1, 2 or 3 wherein the leachable additive is removed by washing the polybenzimidazole article with a solvent for the leachable additive for a period from about 30 seconds to several hours.

17. The product as in any of claims 1, 2, 3, 4 or 5 wherein the polybenzimidazole polymer consists essentially of recurring units of the formula:

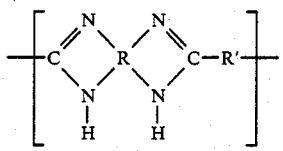

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

18. The product as in any of claims 1, 2, 3, 4 or 5 wherein the polybenzimidazole polymer consists essentially of the recurring units of the formula:

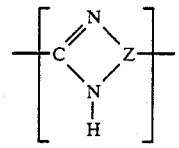

wherein Z is an aromatic nucleus having the nitrogen atoms forming the benzimidazole ring paired upon adjacent carbon atoms of the aromatic nucleus.

19. The product as in any of claims 1, 2, 3, 4 or 5 wherein the polybenzimidazole polymer is poly-2,2'-(m-phenylene)-5,5'-bibenzimidazole.

20. The product produced as in any of claims 1, 2, 3, 4 or 5 wherein a chemical absorbant is mixed with the microporous polybenzimidazole solvent solution prior to the formation of the microporous polybenzimidazole article.

21. The product of claim 20 wherein the chemical absorbant is acivated charcoal.

* * * * *